United States Patent [19]

Lucas

[11] 4,034,824
[45] July 12, 1977

[54] VEHICLE WHEEL LOCK ASSEMBLY
[75] Inventor: Harold P. Lucas, Detroit, Mich.
[73] Assignee: Harold P. Lucas, Detroit, Mich.
[21] Appl. No.: 644,956
[22] Filed: Dec. 29, 1975
[51] Int. Cl.² .................. B60R 25/08; B60T 1/06
[52] U.S. Cl. .......................... 180/114; 70/226; 188/31; 188/69
[58] Field of Search .......... 180/114; 188/31, 69, 188/60; 70/226, 228, 227; 292/39; 74/422

[56]  References Cited
U.S. PATENT DOCUMENTS

| | | | |
|---|---|---|---|
| 810,778 | 1/1906 | Levak | 188/60 |
| 1,393,051 | 10/1921 | Tamborello | 188/31 |
| 1,428,236 | 9/1922 | Jones | 70/226 |
| 1,487,480 | 3/1924 | Scherer | 188/31 |
| 3,308,579 | 3/1967 | Thams | 292/39 X |

FOREIGN PATENT DOCUMENTS

| | | | |
|---|---|---|---|
| 184,746 | 8/1922 | United Kingdom | 188/31 |

Primary Examiner—Joseph F. Peters, Jr.
Assistant Examiner—J. D. Rubenstein
Attorney, Agent, or Firm—Cullen, Settle, Sloman & Cantor

[57]  ABSTRACT

A vehicle wheel lock assembly for enabling the operator of a vehicle having a frame to lock one or more of the four wheels, at will, when the vehicle power is inoperative, which includes a normally retracted reciprocal locking rod mounted on and movable transversely of said frame adapted when advanced to interlock with a wheel. The normally retracted reciprocal actuating rod mounted on said frame for longitudinal movement. The control housing within the vehicle supports a control lever which projects from the housing and is operatively connected to the actuating rod for effecting selective reciprocal movements thereof. Gear mechanism on the frame interconnects the locking rod and the actuating rod.

4 Claims, 5 Drawing Figures

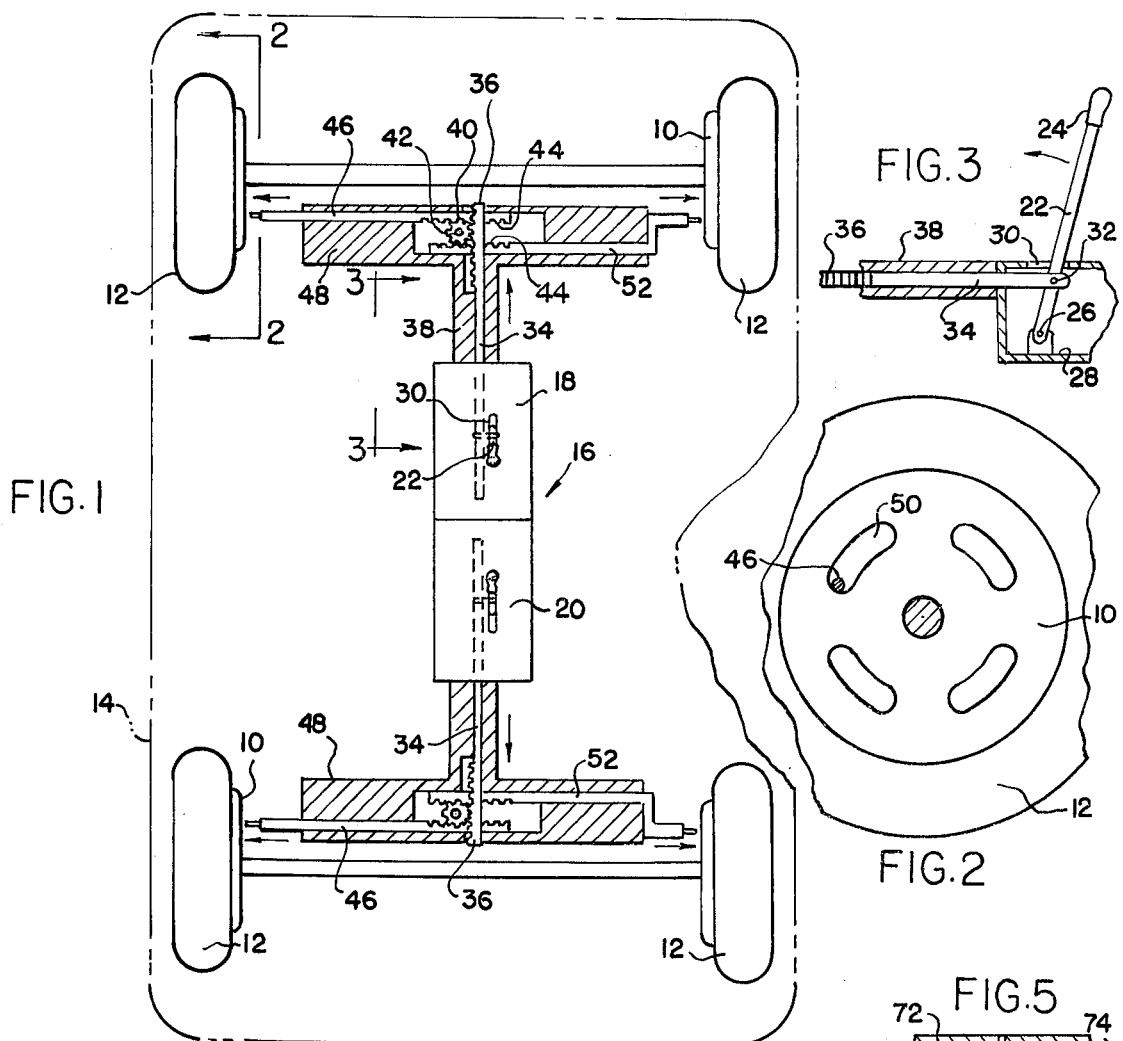

VEHICLE WHEEL LOCK ASSEMBLY

BACKGROUND OF THE INVENTION

This invention is an improvement and a simplification over the wheel lock of the vehicle shown in my copending United States patent application Ser. No. 590,953, filed June 27, 1975. Heretofore, there has long existed the need for a positive lock for the vehicle wheels when the vehicle engine is inoperative in order to prevent theft of the vehicle.

SUMMARY OF THE INVENTION

The present invention is directed to an improved vehicle wheel lock assembly wherein one or more transversely mounted locking rods may be advanced under the manual control of an operator when the vehicle is parked for mechanically locking the wheels against rotation.

It is another object to provide an improved manual control mechanism for the locking rods whereby a manually operable control lever upon the interior of the vehicle is movably mounted with respect to a central housing, pivotally connected to the vehicle frame and operably connected to the locking rod.

These and other objects will be seen from the following specification and claims in conjunction with the appended drawings in which:

FIG. 1 diagrammatically illustrates in plan view a vehicle with one form of wheel locking mechanism.

FIG. 2 is a fragmentary side elevational view of the interior of the vehicle wheel having a plurality of slots to selectively receive the locking rod.

FIG. 3 is a fragmentary section taken in the direction of arrows 3—3 illustrating the mounting of the manual control.

FIG. 4 is a fragmentary plan view similar to FIG. 1 illustrating a modified form of vehicle wheel lock assembly.

FIG. 5 is a fragmentary section taken in the direction of arrows 5—5 of FIG. 4.

It will be understood that the above drawing illustrates several preferred embodiments of the invention, and that other embodiments are contemplated within the scope of the claims hereafter set forth.

DETAILED DESCRIPTION OF THE INVENTION

Referring to the drawing, FIGS. 1, 2 and 3, the vehicle frame or outline is designated at 14 including the conventional wheels 10 with tires 12.

The present locking assembly is generally designated at 16 and includes a housing 18 normally mounted within the vehicle upon said frame.

Since the locking assembly may also incorporate the locking of the rear wheels of the vehicle, an additional housing 20 is provided within the vehicle upon the frame similar to housing 16.

Manually operable control lever 22 with knob 24, FIG. 3, extends through the longitudinal slot 30 of said housing and is pivotally connected at 26 to some portion of the housing at 28 or to the vehicle frame which mounts the housing.

Said lever intermediate its ends is pivotally connected at 32 to the actuating rod 34 which is arranged longitudinally of the vehicle frame and is guidably mounted thereon within the bearing 38. Said actuating rod terminates in the rack gear 36.

Pinion 40 is journaled at 42 upon said frame and is in mesh with rack 36 upon said actuating rod.

Said pinion is also in mesh with the additional rack gear 44 on the transversely extending locking rod 46 and is guided upon the frame by a suitable bearing 48 for reciprocal movements.

In FIG. 1 the locking rod 46 shown normally retracted is adapted on forward projection to mechanically interlock with one of a series of arcuate slots 50 formed at a uniform radius through a portion of the vehicle wheel 10, FIG. 2.

A second locking rod 52 is parallel to locking rod 46 and projects in the opposite direction therefrom, is guidably mounted upon a suitable bearing surface 48, and its free end as shown in FIG. 1 is adapted to mechanically interlock with one of the apertures 50 within the adjacent wheel 10 when advanced. The inner end of the locking rod 52 has a corresponding rack gear 44 also in mesh with the pinion 40.

Accordingly, upon reciprocal movement of the actuating rod 34 through the functioning and operation of the control lever 22, the two locking rods 46, 52 normally retracted as shown in FIG. 1, may be simultaneously advanced outwardly for interlocking engagement with the adjacent wheel.

In the illustrative form shown in FIGS. 1, 2 and 3, forward movement of the manual control lever 22 with respect to the housing slot 30 causes the locking rods 46, 52 to advance outwardly to interlock with the respective wheels. Movement in the opposite direction of the control lever 22 causes said rods to retract to the position shown in FIG. 1.

MODIFIED LOCKING ASSEMBLY

A modified vehicle wheel lock assembly is fragmentarily shown in FIG. 4, being a view similar to the illustration of FIG. 1 with the wheels fragmentarily shown and in section.

The modified locking assembly generally shown at 54 includes housing 56 mounted upon the vehicle frame within the vehicle and includes a manual control lever 58, correspond to lever 22 of FIG. 3 which projects up through the slot 62 in said housing and at its inner end which is pivoted to some portion of the vehicle frame or within the housing such as shown at 26, 28, FIG. 3. Intermediate the ends of the control lever 58 there is provided a cross bar 60 which is pivotally connected to the respective racks 64 and 66. Forward movement of the control lever 58 will cause corresponding forward movement of the rack gears 64 and 66. Racks 64 and 66 extend into the housing 72 forming a part of or connected to the vehicle frame.

Upper rack gear 64 within housing 72 is in mesh with the upper pinion 68 which is journaled within housing 72 upon rod 70.

Elongated arm 74 intermediate its ends is connected with pinion 68 and projects outwardly of said housing. The outer ends of the arm 74 have a pin and slot connection 76, 78 with the outer ends of the diametrically opposed transversely extended normally retracted locking rods 80. These rods are guidably mounted within suitable bearings 82 upon and transversely of the vehicle frame. The lower rack gear 66 extends from housing 56 to a corresponding guide or bearing support 67 (FIG. 4) and into the housing 72 fragmentarily shown in FIG. 5. An end portion of rack gear 66 is in mesh with the second or lower pinion 84 journaled at 70 within the housing 72.

The elongated second arm 86 is intermediate its ends connected to the second pinion 84 and arranged in a cross or scissors form with respect to the first arm 74 and projects outwardly of housing 72.

The respective outer ends of arm 86 have a pin and slot connection 76, 78 with the adjacent diametrically arranged oppositely extending locking rods 80 slidably supported at 82 for reciprocal movement transversely of the vehicle frame as shown at 14 in FIG. 1.

In the embodiment shown in FIG. 4 there are provided for example for the front wheels of the vehicle a pair of parallel spaced normally retracted wheel locking rods 80 for each of the adjacent wheels.

In operation, forward movement of rack 64 rotates pinion 68 counterclockwise and a corresponding counterclockwise rotation of arm 74. This would cause the diametrically opposed locking rods 80 to retract to the position shown in FIG. 4.

At the same time the corresponding forward movement of the lower rack gear 66, in mesh with the lower pinion 84 effects a corresponding clockwise rotation of that pinion in corresponding rotation of the arm 86 for retracting the adjacent flexibly connected locking rods 80.

This therefore corresponds to the extreme forward pivotal movement of the control lever 58 with both rack gear 64 and 66 advanced.

In order to effect outward movement simultaneously of all of the locking rods 80, the lever 58 is retracted with respect to the housing slot 62 causing corresponding retraction of the rack gears 64 and 66.

Rack 64 rotates upper pinion 68 clockwise with a corresponding rotation of the arm 74 and outwardly advancing both of the locking rods 80 to the locking position such as shown in FIG. 2.

The corresponding rearward movement of rack 66 causes a counterclockwise rotation of the lower pinion 84 and the connected arm 86 again causing an outward projection of the corresponding connected arms 80 advancing them outwardly to the locking condition such as shown in FIG. 2.

While a single control housing 56 has been shown in FIG. 4 for the manual control lever 58 for locking the front wheels, for example, of a vehicle, there may be an additional housing 88 fragmentarily shown which corresponds to housing 20 of FIG. 1 for a similar control mechanism for regulating additional pairs of locking rods for the respective rear wheels of the vehicle.

Having described my invention, reference should now be had to the following claims:

I claim:

1. A vehicle wheel lock assembly for enabling the operator of a vehicle having a frame to lock two or more of the four wheels, at will, said vehicle wheel locking means comprising opposed pairs of reciprocal normally retracted locking rods guidably mounted on and movable transversely of said frame, adapted when advanced to respectively interlock with the adjacent wheels;

a pair of spaced manually reciprocal actuating rods guidably mounted on and movable longitudinally of said frame;

a control housing within the vehicle;

a manually operable control lever projected from and mounted upon said housing operably connected to said actuating rods for effecting selective reciprocal movements thereof;

and gear means on said frame interconnecting said locking rods and actuating rods, for establishing and disestablishing an operative locking connection between said locking rods and the adjacent vehicle wheel.

2. In the vehicle wheel lock assembly of claim 1, there being a series of spaced slots formed in said wheels at a uniform radius adapted to selectively receive said locking rods.

3. In the vehicle wheel lock assembly of claim 1, said control lever being pivoted upon said frame, the operable connection between said lever and actuating rods including a cross bar on aid lever pivotally connected to said actuating rods.

4. In the vehicle wheel lock assembly of claim 1, said gear means including upper and lower pinions coaxially journaled upon said frame;

scissor arms intermediate their ends mounted upon each pinion respectively and arranged in cross form;

the free ends of each arm having a pin and slot pivotal connection with the respective inner ends of opposed diametrically arranged locking rods, whereby pivotal movement of said arms in unison will effect simultaneous outward and successive inward movement of all said locking rods;

and rack gears on said actuating rods in mesh with said first and second pinions respectively.

* * * * *